US011914309B2

(12) United States Patent
Liu

(10) Patent No.: US 11,914,309 B2
(45) Date of Patent: Feb. 27, 2024

(54) TONER CARTRIDGE

(71) Applicant: Geehy Microelectronics Inc., Zhuhai (CN)

(72) Inventor: Weichen Liu, Zhuhai (CN)

(73) Assignee: GEEHY MICROELECTRONICS INC., Zhuhai (CN)

( * ) Notice: Subject to any disclaimer, the term of this patent is extended or adjusted under 35 U.S.C. 154(b) by 0 days.

(21) Appl. No.: 18/160,642

(22) Filed: Jan. 27, 2023

(65) Prior Publication Data

US 2023/0176498 A1 Jun. 8, 2023

Related U.S. Application Data

(63) Continuation of application No. PCT/CN2021/108976, filed on Jul. 28, 2021.

(30) Foreign Application Priority Data

Jul. 28, 2020 (CN) ......................... 202010739435.3

(51) Int. Cl.
*G03G 15/08* (2006.01)

(52) U.S. Cl.
CPC ..... *G03G 15/0856* (2013.01); *G03G 15/0865* (2013.01)

(58) Field of Classification Search
USPC ............................................................ 399/58
See application file for complete search history.

(56) References Cited

U.S. PATENT DOCUMENTS

2007/0206965 A1 9/2007 Namiki et al.
2009/0003850 A1* 1/2009 Yamamoto ......... G03G 15/0818 399/27
2011/0085808 A1* 4/2011 Hirata ................ G03G 15/0877 399/27
2012/0183318 A1 7/2012 Sato et al.

FOREIGN PATENT DOCUMENTS

CN 103092046 A 5/2013
CN 104597737 A 5/2015
CN 110908263 A 3/2020

OTHER PUBLICATIONS

The World Intellectual Property Organization (WIPO) International Search Report for PCT /CN2021/108976 dated Nov. 10, 2021 6 Pages (including translation).

* cited by examiner

*Primary Examiner* — Quana Grainger
(74) *Attorney, Agent, or Firm* — ANOVA LAW GROUP PLLC

(57) ABSTRACT

The present disclosure provides a toner cartridge. The toner cartridge includes a toner hopper containing toner, a waste toner bin containing waste toner, and a developing part disposed in the toner hopper. The toner hopper and the waste toner bin are movably connected; and the toner hopper is capable of moving from a first position to a second position relative to the waste toner bin. When the toner hopper is at the first position, the developing part is electrically connected to a printer and capable of receiving a developing voltage signal sent by the printer; and when the toner hopper is at the second position, the developing unit is electrically disconnected from the printer and not capable of receiving the developing voltage signal sent by the printer or not capable of sending an electrical signal to the printer.

18 Claims, 3 Drawing Sheets

TONER CARTRIDGE

CROSS-REFERENCE TO RELATED APPLICATION

This application is a continuation application of PCT Patent Application No. PCT/CN2021/108976, filed on Jul. 28, 2021, which claims the priority to Chinese patent application No. 202010739435.3, filed on Jul. 28, 2020, in the China National Intellectual Property Administration, the entirety of all of which is incorporated herein by reference.

TECHNICAL FIELD

The present disclosure generally relates to the field of print image-forming technology and, more particularly, relates to a toner cartridge.

BACKGROUND

Printing apparatuses (such as inkjet printers, laser printers, all-in-one printers and the like) need printing consumables such as ink cartridges, toner hoppers, toner cartridges and the like during printing processes. Ink cartridges may contain ink; and toner hoppers and toner cartridges may contain toner. The printing consumables have shorter lifespans than printing apparatuses. Therefore, during printing processes, the lifespans of the printing consumables need to be monitored; and users need to purchase and replace the printing consumables frequently after the printing consumables are used up.

The printing consumable may be a toner cartridge (e.g., in Chinese patent application CN201010142920.9). The toner cartridge may include a toner hopper, a waste toner bin, a developing part disposed in the toner hopper, toner contained in the toner hopper, a photosensitive drum on the toner hopper, and other parts. Meanwhile, in order to detect remaining toner amount in the toner cartridge, a detection system for detecting the remaining toner amount is configured in the toner cartridge. By installing a detection part in the toner hopper and detecting the electrical signal between the developing part and the detection part, the remaining toner amount in the toner hopper may be determined. At this point, the developing part, on the one hand, may work as a developing part when the toner cartridge performs developing operation, and on the other hand, may work as a part of the detection system for detecting the remaining toner amount when the remaining toner amount is detected. When the remaining toner amount is being detected, the printer applies relatively high-voltage AC signals to the toner cartridge. These signals have certain impact on the developing operation of the developing part, which may result in poor development quality.

The present disclosure provides a new toner cartridge, which is capable of reducing that the AC signals applied by the printer affects the developing part while realizing detection of the remaining toner amount.

SUMMARY

One aspect of the present disclosure provides a toner cartridge. The toner cartridge includes a toner hopper containing toner and a waste toner bin containing waste toner, where the toner hopper and the waste toner bin are movably connected; and the toner hopper is capable of moving from a first position to a second position relative to the waste toner bin; and a developing part disposed in the toner hopper and a photosensitive drum disposed to be adjacent to the waste toner bin, where the developing part includes a conductive shaft core and is capable of rotating around the shaft core; when the toner hopper is at the first position, the developing part and the photosensitive drum move toward each other to contact each other; and when the toner hopper is at the second position, the developing part and the photosensitive drum physically disconnect and move away from each other. When the toner hopper is at the first position, the developing part is electrically connected to a printer and capable of receiving a developing voltage signal sent by the printer; and when the toner hopper is at the second position, the developing unit is electrically disconnected from the printer and not capable of receiving the developing voltage signal sent by the printer or not capable of sending an electrical signal to the printer.

Other aspects of the present disclosure may be understood by those skilled in the art in light of the description, the claims, and the drawings of the present disclosure.

BRIEF DESCRIPTION OF THE DRAWINGS

To clearly describe technical solutions of various embodiments of the present disclosure, the drawings, which need to be used for describing various embodiments, are described below. Obviously, the drawings in the following description may merely illustrate some embodiments of the present disclosure and may not limit the scope of the present disclosure. For those skilled in the art, other drawings may be obtained in accordance with the drawings without creative efforts.

DETAILED DESCRIPTION

Technical solutions in embodiments of the present disclosure are clearly and completely described with reference to accompanying drawings in embodiments of the present disclosure hereinafter. Obviously, described embodiments are only a part of embodiments of the present disclosure, not all of embodiments of the present disclosure. The parts of embodiments of the present disclosure described and illustrated in accompanying drawings herein may be arranged and designed in a variety of different configurations. Accordingly, following detailed description of embodiments of the present disclosure provided in accompanying drawings is not intended to limit the scope of claimed application, but merely represents optional embodiments of the present disclosure. Based on embodiments of the present disclosure, all other embodiments obtained by those skilled in the art without making creative efforts belong to the protection scope of the present disclosure.

It should be noted that similar numerals and letters denote similar items in following figures; therefore, once an item is defined in one figure, the item may not be further defined and explained in subsequent drawings.

Figure 1:
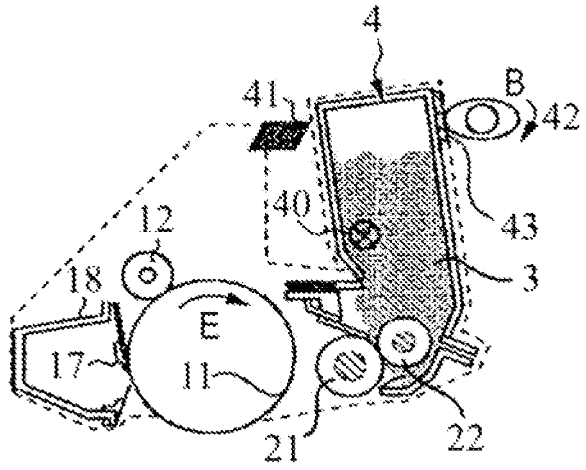
FIG. 1 illustrates a schematic cross-sectional view of a toner cartridge in a first case according to exemplary embodiments of the present disclosure.

A toner cartridge is a replaceable printing consumable, which may be installed in a printer using a detachable manner. FIG. 1 illustrates a schematic cross-sectional view of a toner cartridge in a first case according to exemplary embodiments of the present disclosure. The toner cartridge may include a waste toner bin 18 and a toner hopper 4; and the waste toner bin 18 may be movably connected to the toner hopper 4 (described subsequently).

A photosensitive drum 11 may be adjacent to the position of the waste toner bin 18, which may rotate along the E direction in FIG. 1. The toner cartridge may further include a charging roller 12 and a cleaning plate 17. The charging roller 12 may be configured to charge the photosensitive drum 11; and the cleaning plate 17 may be configured to clean the toner on the surface of the photosensitive drum 11, and also be configured to eliminate residual charges on the surface of the photosensitive drum 11.

In some embodiments, at the position of the toner hopper 4, a developing part 21 and a toner supply roller 22 may be included; and the toner 3 may be accommodated in the toner hopper 4.

FIG. 1 illustrates the first case where the developing part 21 is at a position relatively away from the photosensitive drum 11. The toner hopper 4 may be connected to the waste toner bin 18 through a spring 2, where a spring 41 in a compressed state may have a restoring force to return to a non-compressed state.

Under the force of a driving part 42 disposed on the printer, the toner hopper 4 may rotate around a virtual axis 40. For example, referring to FIG. 1, when the driving part 42 is not starting to rotate, the driving part 42 may have the largest width along the horizontal direction, the driving part 42 may push the upper half of the toner hopper 4 to the left along the horizontal direction, and the spring 41 may be compressed at this point. Meanwhile, due to the existence of the virtual axis 40, the toner hopper 4 may rotate counter-clockwise, and the lower half of the toner hopper 4 may be in a position relatively adjacent to the right side, that is, the second position; and the developing part 21 may be not in contact with the photosensitive drum 11, and the developing part 21 and the photosensitive drum 11 may be relatively away from each other.

When the driving part 42 rotates along the B direction, the width of the driving part 42 along the horizontal direction may gradually decrease, and a force-receiving part 43 on the toner hopper 4 may be no longer pushed by the driving part 42. Pushed by the restoring force of the spring 41 in the compressed state, the toner hopper 4 may rotate clockwise around the axis 40. Therefore, the developing part 21 may move toward the photosensitive drum 11 until the developing part 21 is in contact with the photosensitive drum 11 and may be at a position relatively close to the photosensitive drum 11, that is, the first position shown in FIG. 2.

Figure 2:
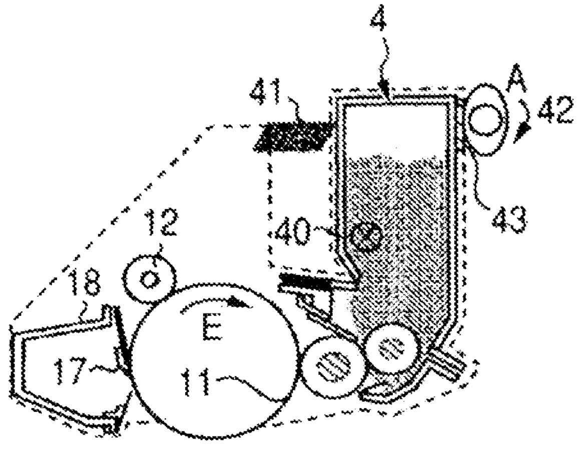
FIG. 2 illustrates a schematic cross-sectional view of a toner cartridge in a second case according to exemplary embodiments of the present disclosure.

In some embodiments, FIG. 2 illustrates a schematic cross-sectional view of the toner cartridge in the second case. When the driving part 42 rotates along a reverse direction opposite to the B direction or continues to rotate along the A direction shown in FIG. 2, the driving part 42 may push the force-receiving part 43 on the toner hopper 4 again. Therefore, the toner hopper 4 may rotate counter-clockwise around the axis 40, the spring 41 may be compressed again, and the toner hopper 4 may return to the position shown in FIG. 1, that is, the developing part 21 may be at the position relatively away from the photosensitive drum 11.

The toner hopper 4 may be configured to accommodate toner and disposed with the developing part 21. The waste toner bin 18 may be configured to accommodate used waste toner and disposed with the photosensitive drum 11. The relative position between the toner hopper and the waste toner bin may be changed, such that the state of the developing part 21 and the photosensitive drum 11 may be contact or non-contact. When the toner hopper 4 is at the first position, the photosensitive drum 11 may be in a close contact with the developing part 21; and the photosensitive drum 11 may be the closest to the developing part 21 and in a relatively close position. When the toner hopper 4 is at the second position, the photosensitive drum 11 may be away from the developing part 21; and the photosensitive drum 11 may be the farthest from the developing part 21 and in a relatively distant position. In addition, the toner supply roller 22 may also be disposed in the toner hopper 4.

The developing part 21 may be, for example, a developing roller or a magnetic roller. The developing part may normally be disposed in the toner hopper. As shown FIG. 1, the developing part 21 may include a conductive shaft core (the shaded part of black oblique lines in FIG. 1), and the developing part 21 may rotate around the shaft core driven by an external force.

Figure 3:
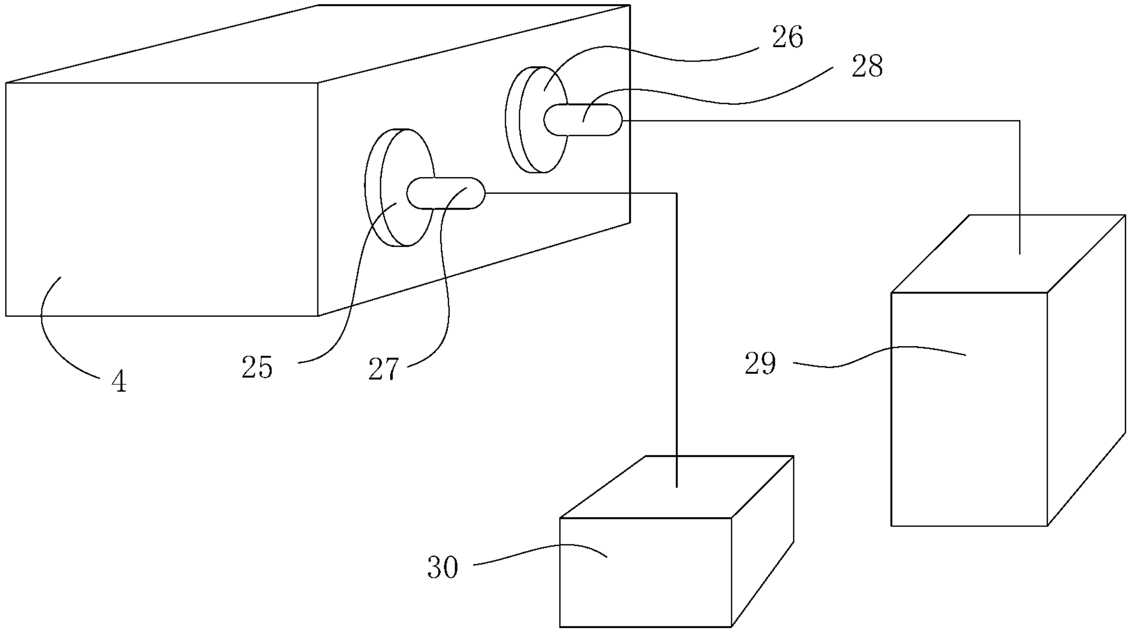
FIG. 3 illustrates a schematic of electrical connection between probes of a printer and contact electrodes on a toner hopper according to exemplary embodiments of the present disclosure.

In some embodiments, along the detection schematic shown in FIG. 3, the first contact electrode 25 and the second contact electrode 26 may be disposed on the side of the toner hopper 4. The printer may apply a detection signal through one of the first contact electrode 25 and the second contact electrode 26, and receive a feedback signal through another contact electrode, thereby detecting the remaining toner amount contained in the toner hopper 4.

For example, the second contact electrode 26 may be configured to receive the detection signal for detecting the remaining toner amount sent by a detection signal source 29 of the printer; and a detector 30 of the printer may receive the feedback signal for detecting the remaining toner amount at the first contact electrode 25.

In some embodiments, the first contact electrode 25 may be electrically connected to the developing part 21, and the second contact electrode 26 may be electrically connected to a detection part. At this point, the first contact electrode 25 may be configured to receive a developing voltage signal applied by the printer to the developing part. In FIG. 3, the probes 27 and 28 on the printer may be configured to be electrically connected to the first contact electrode 25 and the second contact electrode 26 respectively, thereby transmitting electrical signals between the toner hopper 4 and the printer.

In some embodiments, when the printer performs the developing operation, the printer may apply a force to the toner hopper 4 through a mechanical part (such as the driving part 42), such that the toner hopper 4 may be at the first position. At this point, the photosensitive drum on the waste toner bin may be the closest to the developing part on the toner cartridge and in a relatively close position as shown in FIG. 2. Since the first contact electrode is electrically connected to the developing part, the printer may apply the developing voltage signal to the developing part through the first contact electrode, and the developing part may then transfer the toner to the photosensitive drum 11 to form a toner pattern on the photosensitive drum 11. The photosensitive drum 11 may then transfer the toner to printing medium, such as paper, and the developing operation may be completed after heating and fixing toner.

In some embodiments, when the printer needs to detect the remaining toner amount in the toner cartridge, the printer may apply a force to the toner hopper 4 through a mechanical part (such as the driving part 42), such that the toner hopper 4 may be at the second position. At this point, the photosensitive drum 11 may be the farthest away from the developing part 21 and in a relatively distant position as shown in FIG. 1. Therefore, it may reduce the photosensitive drum to affect detection accuracy of the remaining toner amount.

In the present disclosure, when the toner hopper 4 is at the second position, the electrical connection between above-mentioned first contact electrode and the developing part 21 may be disconnected. When the printer detects the remaining toner amount in the toner cartridge, the printer may apply the detection voltage to the first contact electrode and detect the feedback signal on the second contact electrode. The first contact electrode has been electrically disconnected from the developing part, such that the detection signal applied by the printer to the first contact electrode may not be applied to the developing part 21. Therefore, it ensures that the detection signal may not affect the developing part 21 and may not affect the development of the developing part 21. Obviously, the printer may also apply the detection signal through the second contact electrode and detect the feedback signal on the first contact electrode. In such case, since the first contact electrode is electrically disconnected from the developing part, the developing part may also not be affected.

In some embodiments, in order to cooperate with the detection of the remaining toner amount in the toner cartridge by the printer, the detection part may also be disposed in the toner cartridge. The detection part may include a first end and a second end, where the first end may be configured as a signal input terminal, and the second end may be configured as a signal output terminal; or the second end may be configured as a signal input terminal, and the first end may be configured as a signal output terminal.

In some embodiments, when the toner hopper is at the second position, the first end may be electrically connected to the first contact electrode, and the second end may be electrically connected to the second contact electrode. When the toner hopper is at the second position, the detection signal applied to the first contact electrode by the printer may be applied to the first end through the first contact electrode, and the feedback signal of the detection part on the second end may be transmitted to the printer through the second contact electrode. In such way, by adding the detection part, the detection of the remaining toner amount in the toner cartridge by the printer may be satisfied.

When the toner cartridge is disposed with the detection part, in order to avoid that the detection part affects normal development operation during development process, the first end may be electrically disconnected from the first contact electrode when the toner hopper is at the first position. In such way, the developing voltage applied by the printer to the first contact electrode may not be transmitted to the detection part, thereby avoiding that the detection part affects normal development of the developing part.

In some embodiments, in order to further reduce that the detection part affects the development of the toner cartridge, when the toner hopper is at the first position, the second end of the detection part may also be disconnected from the second contact electrode. Therefore, when the toner hopper is at the first position, the detection part may be completely disconnected from the printer, which may avoid any possibility of development interference. The following description with respect to FIG. 4 equivalently illustrates such embodiment.

In some embodiments, in order to ensure that the printer may accurately detect the remaining toner amount in the toner cartridge, the detection part may be a sensor disposed in the toner hopper. For example, the detection part may be two conductive sheets separated by a certain distance. One end of the first conductive sheet may be the first end, and one end of the second conductive sheet may be the second end. When the toner hopper is at the second position, the first end may be electrically connected to the first contact electrode, and the second end may be electrically connected to the second contact electrode. Two conductive sheets may be configured in the toner hopper, such that the toner may flow between the conductive sheets. When the toner in the toner cartridge is sufficient, the space between two conductive sheets may be completely filled with the toner, and the capacitance formed by two conductive sheets may be relatively large. When the toner is insufficient, less toner may be between two conductive sheets, and the capacitance value formed by two conductive sheets may be small. Therefore, the printer may detect the remaining toner amount by detecting the capacitance value formed by two conductive sheets through the first contact electrode and the second contact electrode and determine whether the remaining toner amount is sufficient or insufficient.

In some embodiments, in order to simplify and reduce the cost of the toner cartridge, the detection part may also be one or a combination of electrical devices such as a capacitor, an inductor, and a resistor. Two ends of each of such electrical devices may be respectively defined as the first end and the second end mentioned above. When the toner hopper is at the second position, the first end may be electrically connected to the first contact electrode, and the second end may be electrically connected to the second contact electrode. In such way, the toner cartridge may not need to be disposed with a structure that may actually detect the remaining toner amount, and the printer may also detect the feedback signal for detecting the remaining toner amount through the first contact electrode and the second contact electrode, thereby ensuring that the printer may normally perform the function of detecting the remaining toner amount. It may be understood that in such implementation manner, the information that the detection part provides to the printer may be false remaining toner amount information. The false remaining toner amount information may be configured to ensure that the printer may normally perform the function of detecting the remaining toner amount, which may prevent the printer from being jammed due to inability to perform the function.

In some embodiments, when an electrical device is configured as the detection part, the electrical device may also cooperate with a consumable chip disposed on the toner cartridge. The electrical characteristics of the electrical device (such as the magnitudes of capacitance, resistance, or inductance) may be controlled through the consumable chip. The consumable chip may include a memory and a control circuit. When the toner amount recorded in the memory is at different values, the control circuit may make the electrical device to have different electrical characteristics by transmitting control signals. Therefore, the printer may also detect the change of the remaining toner amount through the first contact electrode and the second contact electrode. Such manner may better guarantee normal operation of the printer.

In some embodiments, in the image-forming solution of contact-type development, a toner supply roller, such as the toner supply roller 22 in FIG. 1, may be normally disposed in the toner hopper. The function of the toner supply roller 22 may be to transfer the toner 3 to the developing part 21. Therefore, the toner supply roller may also need the power provided by the printer. As shown in FIG. 1, the toner supply roller may also include a conductive shaft core (the shaded part of black oblique lines in FIG. 1).

In order to reduce disposed electrodes on the toner cartridge, on the one hand, the second contact electrode may be configured to supply power to the toner supply roller; on the other hand, when detecting the remaining toner amount, the second contact electrode may be still used for detection. When the toner hopper is at the first position and imaging operation is required, the second contact electrode may be electrically connected with the toner supply roller. When the toner hopper is at the second position, in order to ensure that the toner supply roller is not affected at this point when detecting the remaining toner amount, the second contact electrode may be electrically disconnected from the toner supply roller 22. In such way, when the toner cartridge is at the second position and the remaining toner amount is being detected, the detection signal sent by the printer may not be transmitted to the toner supply roller, which may avoid the toner supply roller to be affected. The following descriptions with respect to FIGS. 4 and 5 equivalently illustrate such embodiment.

In some embodiments, when the toner hopper is at the first position, the first contact electrode may be electrically connected to the shaft core of the developing part; and when the toner hopper is at the second position, the first contact electrode may be electrically disconnected from the shaft core of the developing part.

In some embodiments, a switch part manner may be used. When the toner hopper moves from the first position to the second position, the switch part may be pushed to move, such that it realizes that the first contact electrode and the shaft core may be switched from conduction to disconnection. Such switch part may be an electronic switch, a mechanical switch or the like. Obviously, the switch structure may be configured according to needs, instead of using an existing switch.

Optionally, the switch part may include a first switch capable of controlling conduction and disconnection of the first contact electrode and the shaft core of the developing part.

For example, the first contact electrode may be configured as a long-strip part that may move with the movement of the waste toner bin. The first portion of the long-strip part may be conductive, the second portion of the long-strip part may be insulating, and the long-strip part may be disposed between the first electrode and the shaft core. For example, the first portion may be a conductive steel sheet and other materials, and the second portion may be insulating plastic. When the toner hopper is at the first position, the first portion of the long-strip part may be located between the first electrode and the shaft core, and the first contact electrode may be connected to the shaft core through the first portion of the long-strip part. When the toner hopper moves from the first position to the second position, the long-strip part may also move accordingly. When the toner hopper reaches the second position, the second portion of the long-strip part may be located between the first contact electrode and the shaft core; and the electrical connection between the first contact electrode and the shaft core may be disconnected since the second portion of the long-strip part is an insulating material.

If the detection part is also disposed on the toner cartridge, the long-strip part may be configured as the following. When the toner hopper is at the first position, the first portion may be located between the first contact electrode and the shaft core of the developing part, and the second portion may be located between the first contact electrode and the first end of the detection part. At this point, the first contact electrode may be in conduction with the shaft core of the developing part, and the first contact electrode may not be in conduction with the first end of the detection part. When the toner hopper is at the second position, the second portion may be located between the first contact electrode and the shaft core of the developing part, the first portion may be located between the first contact electrode and the first end of the detection part. At this point, the first contact electrode may be electrically disconnected from the shaft core of the developing part, and the first contact electrode may be electrically connected to the first end of the detection part.

The first portion of the long-strip part may be mainly configured for conducting electricity, which may be further simplified. For example, the first portion of the long-strip part may include a hole that allows parts on two sides of the long-strip part to be in contact with each other. For example, when the toner hopper is at the first position, the first contact electrode may be electrically connected to the shaft core of the developing part through the hole. When the toner hopper is at the second position, the first contact electrode may be electrically connected to the first end of the detection part through the hole.

The structure of the switch part described above may also be configured to control the electrical connection between the second contact electrode and the second end of the detection part, or the electrical connection between the second contact electrode and the toner supply roller. The switch part described above may only be exemplary, and various structures that may realize the function of the switch part may be used. The switch control of the switch part may follow the action automatically as the toner hopper moves from the first position to the second position or may be performed by human intervention.

The conduction and disconnection of the first contact electrode and the shaft core of the developing part may also be realized without using the switch part. For example, the position of the first contact electrode may move with the position of the toner hopper. When the toner hopper is at the first position, the first contact electrode may be located between the probe of the printer and the shaft core of the developing part, and the first contact electrode may transmit the voltage provided by the printer to the shaft core of the developing part. When the toner hopper is at the second position, the first contact electrode may move to a position which is not in contact with the shaft core of the developing part or move to a position which is not electrically connected to the probe of the printer. At this point, the first contact electrode may not transmit the electrical signal to the shaft core of the developing part or may not transmit the signal of the shaft core of the developing part to the printer.

Figure 4:
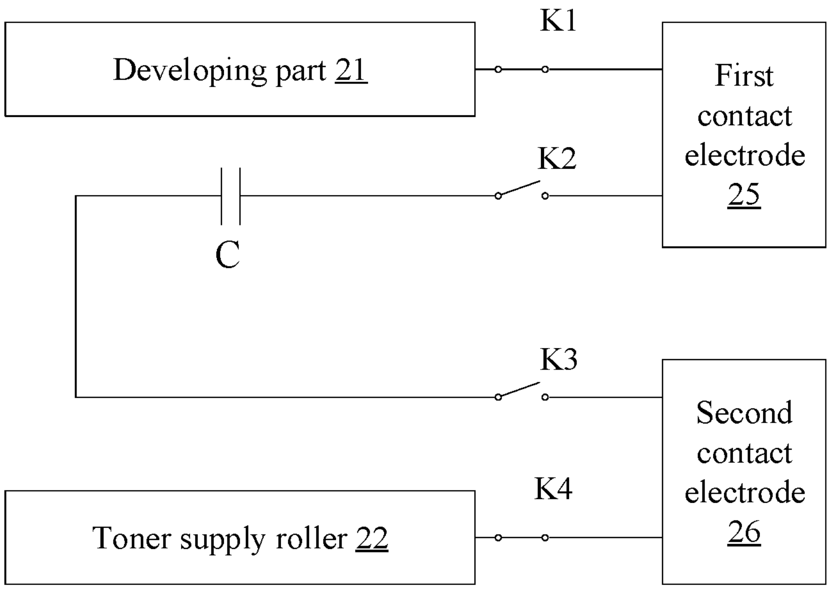
FIG. 4 illustrates an equivalent electrical connection diagram between various parts when the toner cartridge is at a first position according to exemplary embodiments of the present disclosure.
Figure 5:
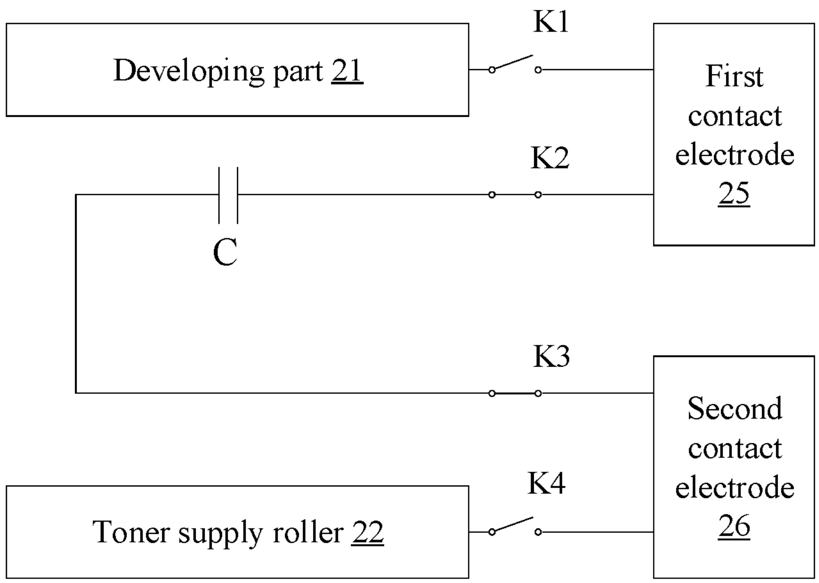
FIG. 5 illustrates an equivalent electrical connection diagram between various parts when the toner cartridge is at a second position according to exemplary embodiments of the present disclosure.

In some embodiments, FIG. 4 and FIG. 5 exemplarily illustrate equivalent effect of various above-mentioned switches. FIG. 4 illustrates equivalent illustration of the electrical connection relationship between the developing part 21, the detection part (e.g., capacitor C), the toner supply roller 22, the first contact electrode 25 and the second contact electrode 26 when the toner hopper is at the first position. FIG. 5 illustrates equivalent illustration of the electrical connection relationship between the developing part 21, the detection part (e.g., the capacitor C), the toner supply roller 22, the first contact electrode 25 and the second contact electrode 26 when the toner hopper is at the second position. The first end and the second end of the detection part (e.g., the capacitor C) may be respectively connected to the first contact electrode 25 and the second contact electrode 26 through a switch.

In FIG. 4, when the toner hopper is at the first position, the first contact electrode 25 may be electrically connected to the developing part 21 (equivalent to that the switch K1 is connected to be in conduction), and disconnected from the detection part (e.g., the capacitor C) (equivalent to that the switch K2 is disconnected to be in cutoff); and the second contact electrode 26 may be disconnected from the detection part (e.g., the capacitor C) (equivalent to that the switch K3 is disconnected to be in cutoff), and electrically connected to the toner supply roller 22 (equivalent to that the switch K4 is close to be in conduction).

Optionally, for one embodiment shown in FIG. 4, only one of the switches K2 and K3 may be disconnected, or both switches may be disconnected.

In FIG. 5, when the toner hopper is at the second position, the first contact electrode 25 may be disconnected from the developing part 21 (equivalent to that the switch K1 is disconnected to be in cutoff), and electrically connected to the detection part (e.g., the capacitor C) (equivalent to that the switch K2 is connected to be in conduction); and the second contact electrode 26 may be electrically connected to the detection part (e.g., the capacitance C) (equivalent to that the switch K3 is connected to be in conduction), and disconnected from the toner supply roller 22 (equivalent to that the switch K4 is disconnected to be in cutoff).

Optionally, for one embodiment shown in FIG. 5, the switch K4 may or may not be disconnected.

In some embodiments, the toner cartridge may not be disposed with the first contact electrode, and the shaft core of the developing part may be in direct contact with the probe of the printer, thereby receiving the developing voltage signal sent by the printer. In such case, in order to control the conduction and disconnection between the shaft core of the developing part and the probe of the printer, a blocking part may be disposed between the probe of the printer and the shaft core. The blocking part may be made of an insulating material (such as rubber, plastic, glass, ceramics and the like) and move with the movement of the toner hopper. When the toner hopper is at the first position, the blocking part may be not located between the shaft core of the probe of the printer and the developing part, which may not affect the contact between the probe of the printer and the shaft core. When the toner hopper is at the second position, the blocking part may be located between the probe of the printer and the shaft core of the developing part, which may block the contact between the probe of the printer and the shaft core. Therefore, the shaft core of the developing part may not receive the electrical signal sent by the printer or transmit the electrical signal to the printer.

In each of the above embodiments, the memory may be, but may not be limited to, random access memory (RAM), read only memory (ROM), programmable read-only memory (PROM), erasable programmable read-only memory (EPROM), electric erasable programmable read-only memory (EEPROM), flash memory and the like.

The control circuit may be an integrated circuit chip with signal processing capability. Above-mentioned control circuit may be a general-purpose processor, including a central processing unit (CPU), a network processor (NP) and the like. The control circuit may also be a digital signal processor (DSP), an application specific integrated circuit (ASIC), a field programmable gate array (FPGA) or other programmable logic device and discrete gate, or a transistor logic device and a discrete hardware part. Various methods, steps, and logic block diagrams disclosed in embodiments of the present disclosure may be implemented or executed. A general-purpose processor may be a microprocessor, or the processor may be any conventional processor or the like.

Those skilled in the art should understand that the consumable chip of the present disclosure may include a memory and a processor (CPU). The memory may be configured to store program instruction codes, and the processor may be configured to execute the program instruction codes to implement the data processing method applied to consumable chips in above-mentioned embodiments. Embodiments of the present disclosure may be provided as methods, devices, or computer program products. Therefore, embodiments of the present disclosure may use the form of an entire hardware embodiment, an entire software embodiment, or an embodiment combining software and hardware aspects. Furthermore, embodiments of the present disclosure may use the form of a computer program product embodied on one or more computer-usable storage media (including but not limited to disk storage, CD-ROM, optical storage and the like) having computer-usable program code embodied therein.

Embodiments of the present disclosure are described with reference to flowcharts and/or block diagrams of methods, devices (systems), and computer program products according to embodiments of the present disclosure. It should be understood that each flow and/or block in the flowcharts and/or block diagrams, and a combination of flows and/or blocks in the flowcharts and/or block diagrams may be realized by computer program instructions. These computer program instructions may be stored in a memory or a non-transitory computer readable storage medium coupled to a processor of a general purpose computer, a special purpose computer, an embedded processor, or other programmable data processing device, such that instructions executed by the processor of the computer or other programmable data processing equipment may be configured to generate the apparatus for realizing the functions specified in one or more flows of the flowcharts and/or one or more blocks of the block diagrams. For example, the memory and the processor may be included in an electronic device for at least performing the disclosed methods.

From above-mentioned embodiments, it can be seen that the solutions according to the present disclosure may achieve at least following beneficial effects.

According to the solutions of the present disclosure, when the toner hopper is at the second position, the first contact electrode has been electrically disconnected from the developing part, and the detection signal applied by the printer to the first contact electrode may not be applied to the developing part, which may avoid the detection signal from influencing the developing part and the development of the developing part.

Above-mentioned embodiments may only be optional embodiments of the present disclosure and may not be intended to limit the present disclosure. For those skilled in the art, various modifications and changes may be made to the present disclosure. Any modifications, equivalent replacements, improvements and the like made within the spirit and principles of the present application shall be within the protection scope of the present disclosure.

What is claimed is:

1. A toner cartridge, comprising:

a toner hopper containing toner and a waste toner bin containing waste toner, wherein the toner hopper and the waste toner bin are movably connected; and the toner hopper is capable of moving from a first position to a second position relative to the waste toner bin; and a developing part disposed in the toner hopper and a photosensitive drum disposed to be adjacent to the waste toner bin, wherein the developing part includes a conductive shaft core and is capable of rotating around the shaft core; when the toner hopper is at the first position, the developing part and the photosensitive drum move toward each other to contact each other; and when the toner hopper is at the second position, the developing part and the photosensitive drum physically disconnect and move away from each other, wherein:

when the toner hopper is at the first position, the developing part is electrically connected to a printer and capable of receiving a developing voltage signal sent by the printer; and when the toner hopper is at the second position, the developing unit is electrically disconnected from the printer and not capable of receiving the developing voltage signal sent by the printer or not capable of sending an electrical signal to the printer.

2. The toner cartridge according to claim 1, further including:

a first contact electrode disposed in the toner hopper, wherein the first contact electrode is configured to receive the developing voltage signal sent by the printer to the developing part, wherein:

when the toner hopper is at the first position, the first contact electrode is electrically connected to the shaft core of the developing part; and when the toner hopper is at the second position, the first contact electrode is electrically disconnected from the shaft core of the developing part, or the first contact electrode is electrically disconnected from a probe of the printer.

3. The toner cartridge according to claim 2, further including:

a second contact electrode disposed in the toner hopper, wherein the second contact electrode is configured to receive a detection signal from the printer for detecting a remaining toner amount.

4. The toner cartridge according to claim 3, further including:

a detection part, wherein:

the detection part includes a first end and a second end; and when the toner hopper is at the second position, the first contact electrode is electrically connected to the first end, and the second contact electrode is electrically connected to the second end.

5. The toner cartridge according to claim 4, wherein:

when the toner hopper is at the first position, the first contact electrode is electrically disconnected from the first end.

6. The toner cartridge according to claim 4, wherein:

when the toner hopper is at the first position, the second contact electrode is electrically disconnected from the second end.

7. The toner cartridge according to claim 3, wherein:

a toner supply roller is also disposed in the toner hopper; and when the toner hopper is at the first position, the second contact electrode is electrically connected to a shaft core of the toner supply roller.

8. The toner cartridge according to claim 7, wherein:

when the toner hopper is at the second position, the second contact electrode is electrically disconnected to the shaft core of the toner supply roller.

9. The toner cartridge according to claim 1, further including:

a switch part, capable of controlling conduction and disconnection of each electrical connection.

10. The toner cartridge according to claim 9, wherein:

the switch part includes a first switch capable of controlling conduction and disconnection of the first contact electrode and the shaft core of the developing part.

11. The toner cartridge according to claim 4, further including:

a switch part, capable of controlling conduction and disconnection of the first contact electrode and the first end of the detection part.

12. The toner cartridge according to claim 4, further including:

a switch part, capable of controlling conduction and disconnection of the second contact electrode and the second end of the detection part.

13. The toner cartridge according to claim 7, further including:

a switch part, capable of controlling conduction and disconnection of the second contact electrode and the shaft core of the toner supply roller.

14. The toner cartridge according to claim 4, wherein:

the detection part includes a conductive part disposed in the toner hopper.

15. The toner cartridge according to claim 4, wherein:

the detection part includes a capacitor, a resistor, an inductor, or a combination thereof.

16. The toner cartridge according to claim 4, wherein:

the conductive part includes two conductive sheets disposed at intervals in the toner hopper.

17. The toner cartridge according to claim 1, further including:

a blocking part, wherein when the toner hopper is at the second position, the blocking part is located between the shaft core of the developing part and a probe of the printer to block electrical connection between the shaft core of the developing part and the probe of the printer.

18. The toner cartridge according to claim 1, further including:

a first contact electrode disposed in the toner cartridge, wherein:

the first contact electrode is configured to receive a developing voltage signal sent by the printer to the developing part;

when the toner hopper is at the first position, the first contact electrode sends the developing voltage signal of the printer to the shaft core of the developing part; and when the toner hopper is at the second position, the first contact electrode does not send the developing voltage signal of the printer to the shaft core of the developing part or does not send a signal of the shaft core of the developing part to the printer.

* * * * *